US008773979B2

(12) United States Patent
Chueh et al.

(10) Patent No.: US 8,773,979 B2
(45) Date of Patent: Jul. 8, 2014

(54) SYSTEM AND METHOD FOR ASSISTING USER IN TROUBLESHOUTING NETWORK CONNECTION PROBLEMS

(75) Inventors: Aaron Chueh, Taipei (TW); Ya-Hui Huang, Taipei (TW)

(73) Assignee: D-Link Corporation, Taipei (TW)

( * ) Notice: Subject to any disclaimer, the term of this patent is extended or adjusted under 35 U.S.C. 154(b) by 300 days.

(21) Appl. No.: 13/064,519

(22) Filed: Mar. 30, 2011

(65) Prior Publication Data
US 2012/0147739 A1    Jun. 14, 2012

(30) Foreign Application Priority Data
Dec. 10, 2010 (TW) ............... 99143171 A

(51) Int. Cl.
| G06F 9/06 | (2006.01) |
| G06F 9/44 | (2006.01) |
| H04L 12/24 | (2006.01) |
| G06F 9/00 | (2006.01) |
| G06F 11/00 | (2006.01) |
| H04M 3/08 | (2006.01) |

(52) U.S. Cl.
CPC .......... *G06F 9/4446* (2013.01); *H04L 41/0663* (2013.01); *H04M 3/08* (2013.01)
USPC .......................................... 370/221; 370/216

(58) Field of Classification Search
None
See application file for complete search history.

(56) References Cited

U.S. PATENT DOCUMENTS

| 7,313,592 | B1 * | 12/2007 | Huboi et al. ................... 709/203 |
| 7,904,400 | B2 * | 3/2011 | Bussert et al. ................... 706/45 |
| 2004/0201867 | A1 * | 10/2004 | Katano ......................... 358/1.15 |
| 2005/0154985 | A1 * | 7/2005 | Burkhart et al. .............. 715/705 |
| 2006/0129931 | A1 * | 6/2006 | Simons et al. ................ 715/705 |
| 2009/0019141 | A1 * | 1/2009 | Bush et al. ..................... 709/223 |

OTHER PUBLICATIONS

Netgear, Wireless ADSL Modem Router Setup Manual, 2006.*

* cited by examiner

*Primary Examiner* — Hanh N Nguyen
*Assistant Examiner* — Joshua A Kading
(74) *Attorney, Agent, or Firm* — Bacon & Thomas, PLLC

(57) ABSTRACT

The present invention is to provide a system for assisting a user in troubleshooting network connection problems, which includes a main terminal device (e.g., a computer) and a mediation device (e.g., a router) connected to the main terminal device and storing an assisting web page. Upon receiving a web page request instruction from the main terminal device, the mediation device redirects the web page request instruction to a website address. When the mediation device determines that itself is not connected to the Internet (i.e., a network connection problem occurs), the mediation device will send the assisting web page to the main terminal device. The assisting web page is displayed by the main terminal device through a browser thereof, so as for the user to troubleshoot the network connection problem according to the steps specified in the assisting web page (e.g., to perform a line inspection, a light signal check, etc.).

6 Claims, 5 Drawing Sheets

SYSTEM AND METHOD FOR ASSISTING USER IN TROUBLESHOUTING NETWORK CONNECTION PROBLEMS

FIELD OF THE INVENTION

The present invention relates to a system for assisting a user in troubleshooting network connection problems, which includes a main terminal device (e.g., a computer) and a mediation device (e.g., a router) connected to the main terminal device and storing an assisting web page. When the mediation device determines that itself is not connected to the Internet (i.e., a network connection problem occurs), the mediation device will send the assisting web page to the main terminal device, so as for the user to troubleshoot the network connection problem according to the steps specified in the assisting web page (e.g., to perform a line inspection, a light signal check, etc.).

BACKGROUND OF THE INVENTION

A router is a computer network device located at the junction between and configured to connect at least two networks. More specifically, a router performs routing by sending data packets through the networks to the destination(s). As the availability of broadband connection increases, more and more people install routers in their homes and connect several terminal devices (e.g., personal computers) to one router so as for the terminal devices to connect to and access data on the Internet through the router. In addition to wired routers, wireless routers were developed for use with wireless terminal devices (e.g., mobile phones, laptop computers). A wireless terminal device connects to a wireless router via Wi-Fi or other wireless communication technologies and thereby connects to the Internet. Nowadays, some Internet service providers (ISPs) would provide wireless routers while installing broadband connection in clients' homes, thus allowing the clients to make Internet connection at home using wireless terminal devices.

Indeed, routers are advantageously capable of connecting a plurality of terminal devices to the Internet at the same time, but it is difficult for ordinary users to troubleshoot network connection problems when the terminal devices fail to connect to the Internet through the routers. Since few users have the knowledge of advanced network technology and are familiar with how cables are connected to a router and what the light signals of a router mean, should a network connection problem occur, users tend not to hesitate to make phone calls to their ISPs for help. Such phone calls, however, may turn into a tremendous human resource and financial burden on the ISPs, which is highly undesirable. If a user decides to solve the problem by referring to the router's user guide (either in paper or CD format), chances are the document or CD is missing, so the desired troubleshooting instruction cannot be found. Consequently, this DIY approach can be both inconvenient and ineffective. Even if the user guide CD is well kept, it is necessary for the user to install the troubleshooting or explanation program from the CD to the terminal device in use when network connection problems occur. Since the installation process could be complicated and time-consuming, this approach also causes inconvenience to the user.

The causes of network connection interruption vary from case to case, including cable connection errors. However, for most users, the troubleshooting of network connection problems is by no means easy. A user who experiences such a problem and is unable to identify where goes wrong may easily attribute the problem entirely to the router. As a result, the user may lose faith in the brand of the router being used, which is undoubtedly a huge loss to the router's manufacturer. The user who blames the router for the network connection problem is very likely to buy another router but find the problem persists. Thus, not only is the money wasted, but also the user is perplexed.

Therefore, the issue to be addressed by the present invention is to design a system which is applicable to an existing network environment and configured to assist a user in troubleshooting network connection problems. It is desirable that, whenever a network connection problem takes place, an assisting web page will be provided timely to the user so as for the user to troubleshoot the network connection problem according to the steps specified in the assisting web page.

BRIEF SUMMARY OF THE INVENTION

In view of the various drawbacks of the conventional approaches to troubleshooting network connection problems, the inventor of the present invention conducted extensive research and repeated trials and finally succeeded in developing a system and method for assisting a user in troubleshooting network connection problems. The system and method disclosed herein are designed to provide an assisting web page to the user in a timely manner when a network connection problem occurs. Thus, the user can solve the network connection problem by himself or herself according to the assisting web page without having to phone the ISP for help.

It is an object of the present invention to provide a system for assisting a user in troubleshooting network connection problems. The system includes a mediation device (e.g., a router) and a main terminal device (e.g., a personal computer, a laptop computer). The mediation device, which is connected to the main terminal device, includes a storage unit for storing an assisting web page that details the steps for troubleshooting connection problems. Upon receiving a web page request instruction from the main terminal device, the mediation device redirects the web page request instruction to a website address that is contained in the web page request instruction. If the mediation device determines that itself is not connected to the Internet (i.e., a network connection problem occurs), the mediation device will send the assisting web page to the main terminal device. The assisting web page is displayed by the main terminal device through a browser thereof, so as for the user to troubleshoot the network connection problem according to the steps specified in the assisting web page (e.g., to perform a line inspection, a light signal check, etc.). As it is not necessary to install any additional troubleshooting program or explanation program into the main terminal device, the user is spared the otherwise complicated installation process and can save a lot of time.

It is another object of the present invention to provide the foregoing system, wherein the system further includes an auxiliary terminal device (e.g., a mobile phone). The auxiliary terminal device stores certain device information (e.g., the brand and model number of the auxiliary terminal device) and is connected to the mediation device. If the mediation device determines that the auxiliary terminal device is unable to make Internet connection through the mediation device (e.g., due to a wrong setting in the auxiliary terminal device), the mediation device will retrieve the device information from the auxiliary terminal device and, according to the device information, connect to the corresponding service server via the Internet. The mediation device then downloads the support web page corresponding to the device information and sends the support web page to the main terminal device. The support web page is displayed in the browser of the main terminal device, thus allowing the user to follow the steps specified in the support web page and set or adjust the auxiliary terminal device correctly. Once the setting or adjustment is done, the auxiliary terminal device shall have no problem connecting to the Internet by way of the mediation device. Therefore, by virtue of the technical features described above, whenever the auxiliary terminal device fails to make Internet connection through the mediation device, the user can read the contents of the support web page from the browser of the main terminal device in no time. In doing so, not only is the troubleshooting of network connection problems made easy, but also the user is saved from the embarrassment of buying a new mediation device that does not help in solving the connection problem encountered.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

The inventor of the present invention has long been engaged in the research and development of network systems and thus found the drawbacks of the conventional approaches to troubleshooting network connection problems. As previously mentioned, a user facing network connection problems tends to call the ISP immediately for help, and yet this approach places a huge burden on the ISP. Some users would resort to the user guide CDs for troubleshooting instruction, but program installation from the user guide CDs takes extra time, if the CDs can be found at all. While the industry is devoted to overcoming the aforementioned drawbacks, an ideal solution has yet to be found. In consideration of the above, the inventor of the present invention came up with the idea of storing an assisting web page into a mediation device that is configured to send the assisting web page to a terminal device opportunely. The assisting web page is intended to guide the user through such troubleshooting steps as checking the cables, checking the light signals of the mediation device (e.g., router), and so forth.

Figure 1:
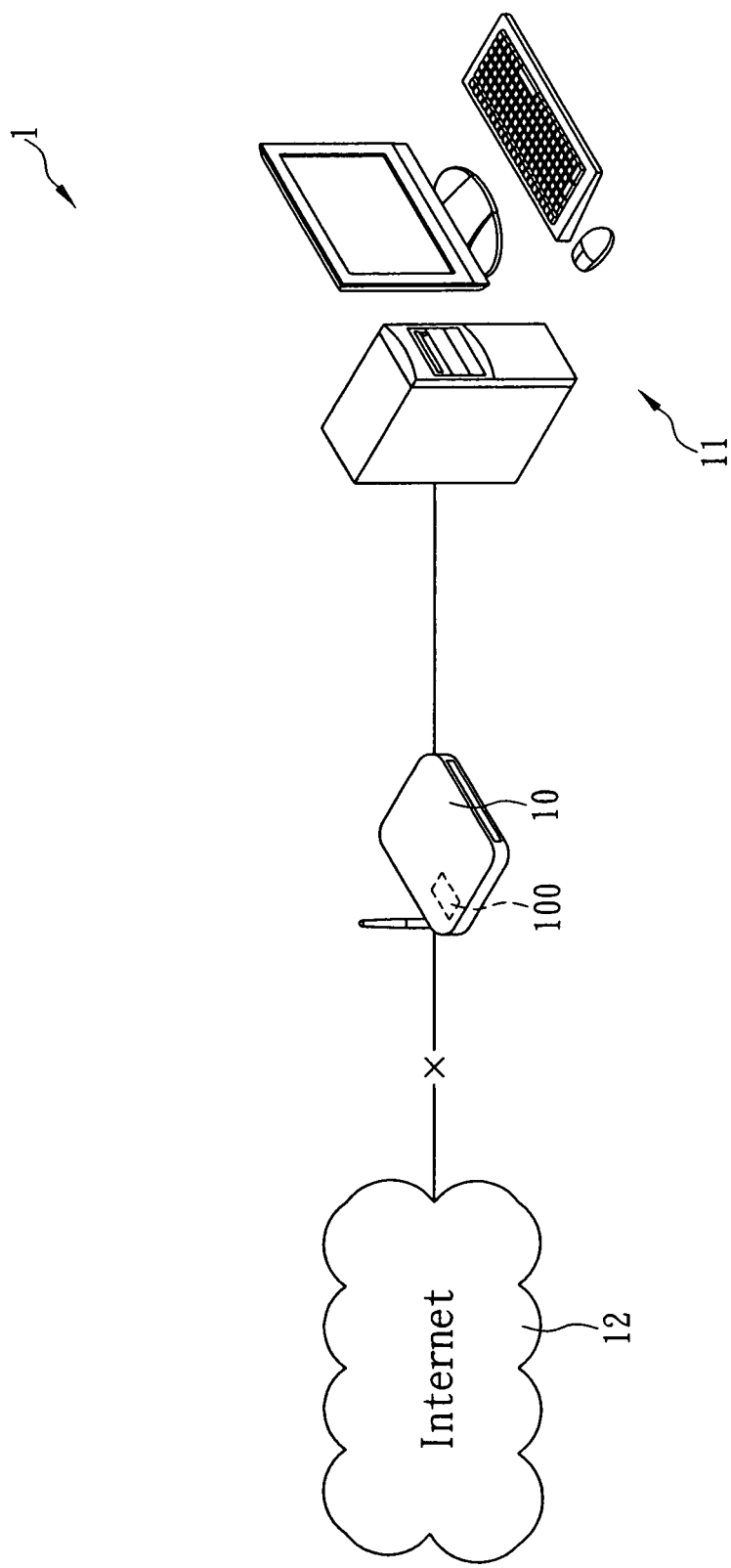
FIG. 1 schematically shows a system according to a first preferred embodiment of the present invention.
Figure 5:
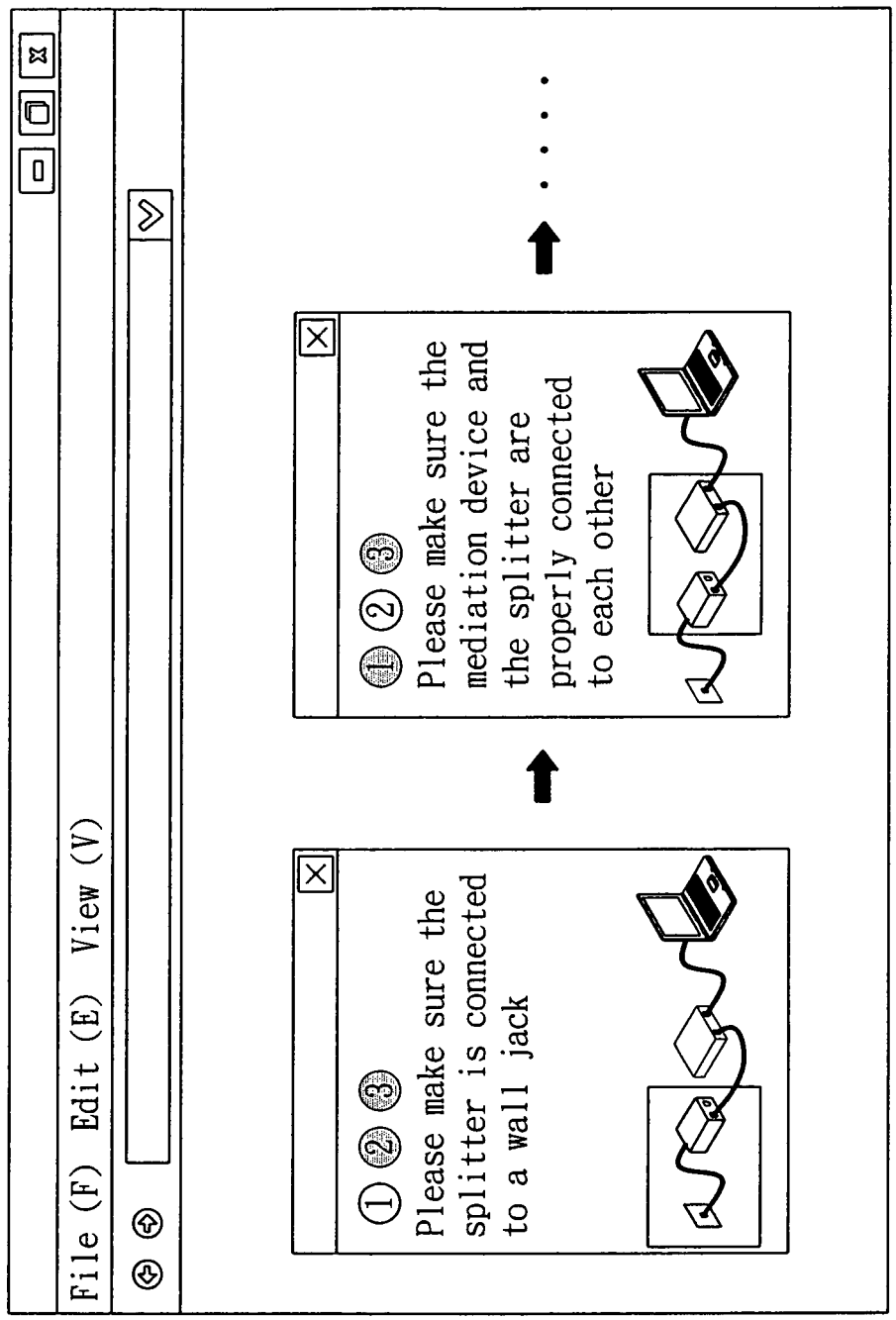
FIG. 5 schematically shows an assisting web page according to the present invention.

The present invention provides a system for assisting a user in troubleshooting network connection problems. According to a first preferred embodiment of the present invention as shown in FIG. 1, a system 1 includes a mediation device 10 and a main terminal device 11. In this preferred embodiment, the mediation device 10 is a router, and the main terminal device 11 is a personal computer; however, the present invention is not limited thereto. The mediation device 10 can be other network devices (e.g., a gateway, a modem, etc.), and the main terminal device 11 can be other electronic devices (e.g., a laptop computer) as well. As shown in FIG. 1, the mediation device 10 is provided with a storage unit 100, which can be a flash memory in the mediation device 10 but is not limited thereto. The storage unit 100 stores an assisting web page that contains steps for troubleshooting connection problems. For example, the steps include: "make sure the splitter connected to the mediation device (e.g., router) is connected to a wall jack", "make sure the mediation device (e.g., router) and the splitter are properly connected to each other", "check the light signals of the mediation device (e.g., router)", and "restart the mediation device (e.g., router)". The assisting web page can be designed as depicted in FIG. 5, wherein the steps for troubleshooting network connection problems are shown graphically for easy reference.

Figure 2:
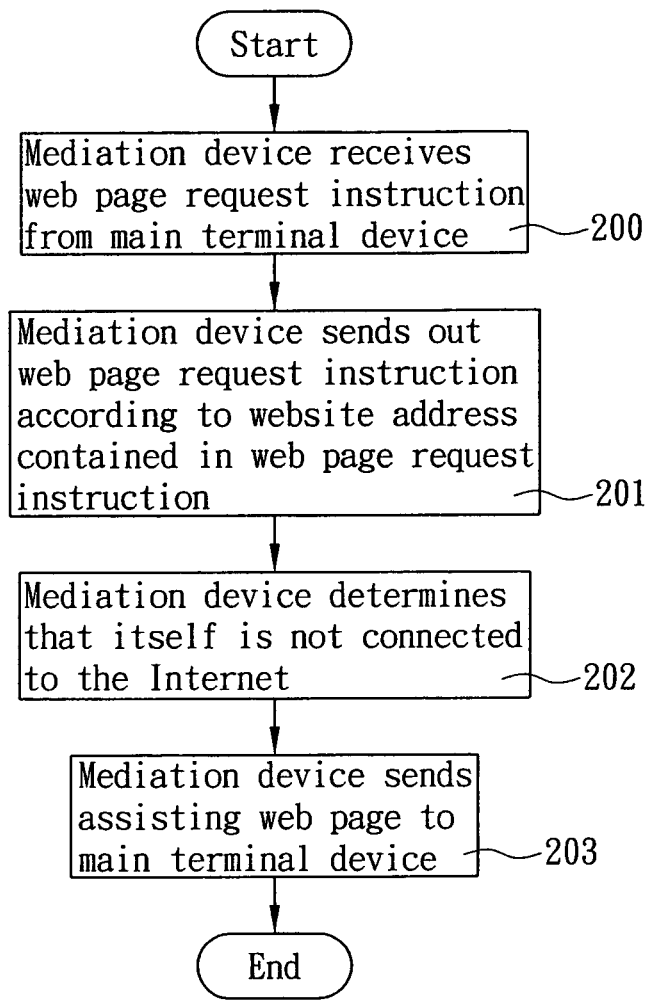
FIG. 2 is a flowchart of the first preferred embodiment of the present invention.

In the first preferred embodiment as shown in FIG. 1, the main terminal device 11 is connected to the mediation device 10 by a network cable. The user can operate the main terminal device 11 and access information on the Internet via a browser installed in the main terminal device 11. It should be noted that, while the mediation device 10 and the Internet 12 are shown in FIG. 1 as connected, the mediation device 10 in this embodiment is having setting or cable connection errors that prevent the mediation device 10 from connecting to the Internet 12. Referring to FIG. 2, in order to send the assisting web page from the storage unit 100 to the main terminal device 11 and thereby allow the user to carry out the troubleshooting steps specified in the assisting web page (as shown in FIG. 5), the following steps are performed:

(200) The mediation device 10 receives a web page request instruction from the main terminal device 11. To generate the web page request instruction, the user operates the browser of the main terminal device 11 by clicking a hyperlink or inputting a website address (e.g., www.google.com) into the address bar of the browser.

(201) According to the website address contained in the web page request instruction, the mediation device 10 sends the web page request instruction to the web server (not shown) corresponding to the website address.

(202) The mediation device 10 determines that it is not connected to the Internet 12. In other words, the mediation device 10 cannot send out the web page request instruction successfully.

(203) The mediation device 10 sends the assisting web page to the main terminal device 11, so as for the main terminal device 11 to display the assisting web page through the browser.

It should be pointed out that, since the mediation device 10 in the present preferred embodiment is experiencing network connection problems, it does not send out the web page request instruction successfully in step (201). After the mediation device 10 sends the assisting web page to the main terminal device 11 in step (203), the main terminal device 11 receives the assisting web page and displays the assisting web page with its browser. Therefore, the user can follow the steps specified in the assisting web page (e.g., "Please make sure the splitter is connected to a wall jack." as shown in FIG. 5) and sequentially perform a line inspection, a light signal check, and so on, thereby completing the troubleshooting of network connection problems.

With reference to FIG. 1, when the user tries to make Internet connection using the main terminal device 11 (e.g., to send a web page request instruction), the technical features of the first preferred embodiment enable the mediation device 10 to send the assisting web page to the main terminal device 11 as soon as the mediation device 10 finds itself out of connection with the Internet 12. Hence, whenever a network connection problem occurs, the user can immediately see the assisting web page from the browser of the main terminal device 11 and take the troubleshooting actions specified in assisting web page, without having to install any additional explanation program or troubleshooting program into the main terminal device 11. In consequence, the time otherwise required for installing the explanation program or troubleshooting program is saved, and it does not matter if the user guide CD of the mediation device 10 is lost. Moreover, since the assisting web page helps guide the user in troubleshooting network connection problems, there is no need to call the ISP immediately after network connection problems occur, and the burden on the ISP which may otherwise result from such calls is substantially relieved. Not only that, the present invention can keep the user from attributing whatever connection problems to the mediation device 10 and hence from spending extra money to buy another mediation device that does not help at all.

Figure 3:
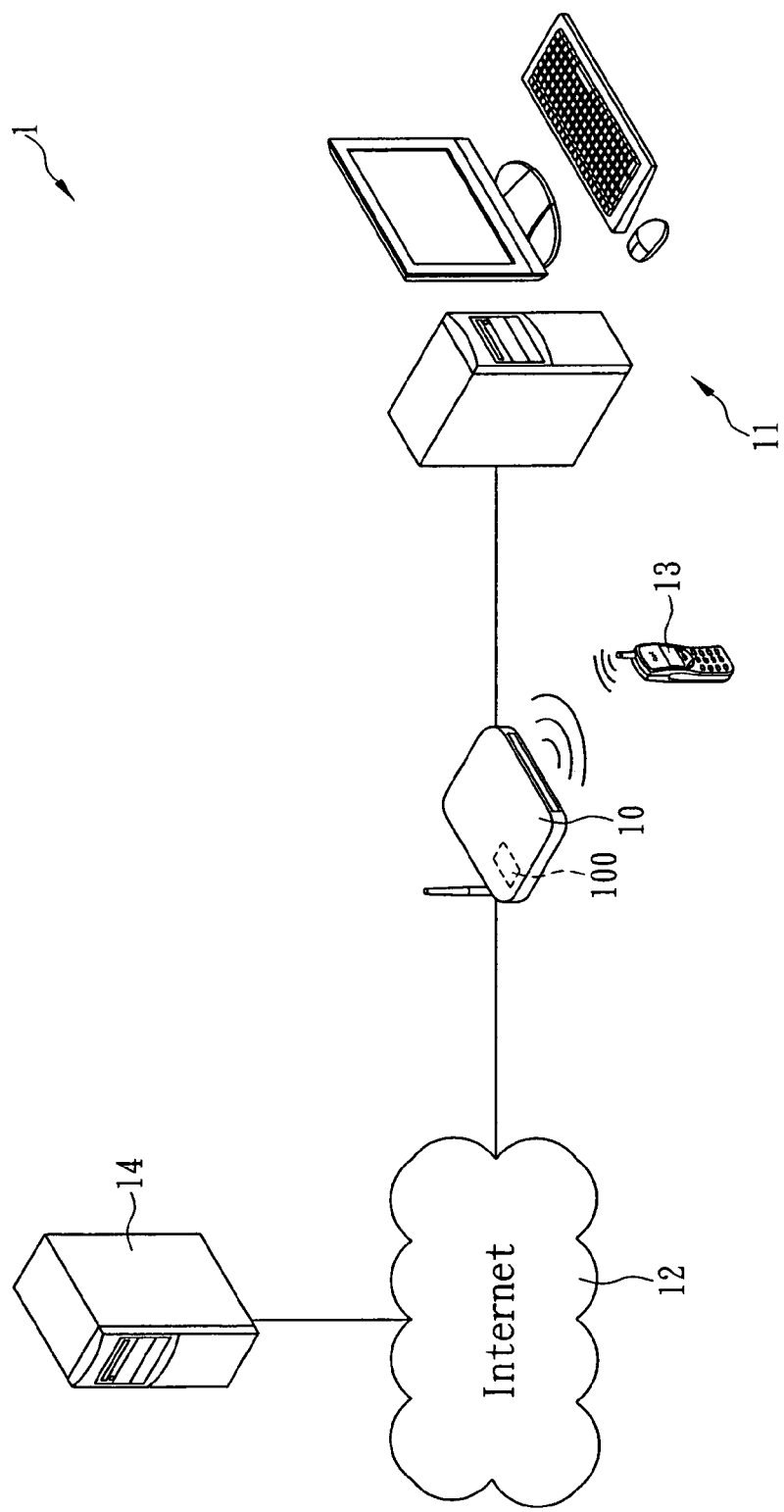
FIG. 3 schematically shows a system according to a second preferred embodiment of the present invention.

Please refer to FIG. 3 for a second preferred embodiment of the present invention. In addition to the mediation device 10 and the main terminal device 11 described above, the system 1 further includes an auxiliary terminal device 13 and a service server 14. In the second preferred embodiment, the auxiliary terminal device 13 is a mobile phone but is not limited thereto. For instance, the auxiliary terminal device 13 can also be a personal digital assistant (PDA) or other electronic devices. Besides, the number of the auxiliary terminal device 13 is not limited to only one. It is feasible for the user to simultaneously connect a plurality of auxiliary terminal devices 13 to the mediation device 10 while using the system 1, so as for the plural auxiliary terminal devices 13 to make Internet connection through the mediation device 10 at the same time.

Figure 4:
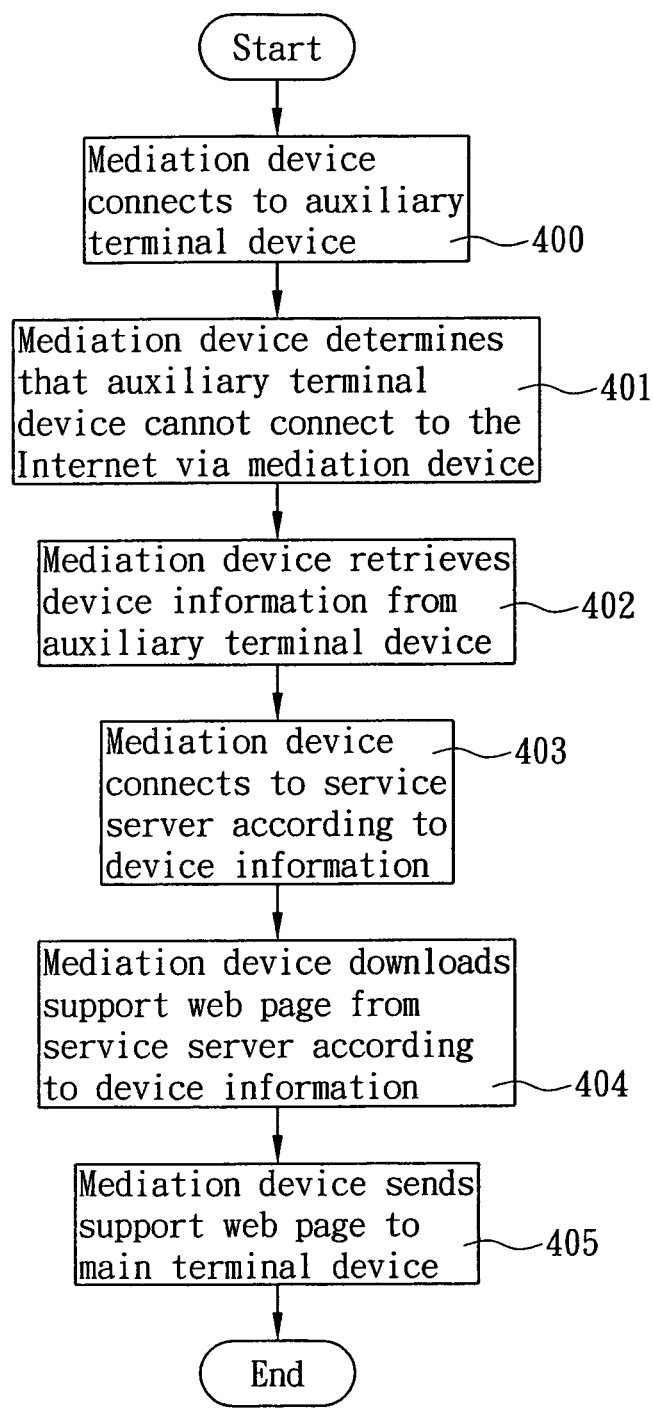
FIG. 4 is a flowchart of the second preferred embodiment of the present invention.

The auxiliary terminal device 13 in FIG. 3 stores certain device information, which in the second preferred embodiment includes the brand and model number of the auxiliary terminal device 13. The auxiliary terminal device 13 is intended to connect with the mediation device 10 in a wireless manner (e.g., using Wi-Fi technology). However, the auxiliary terminal device 13 is now wrongly set and therefore cannot make Internet connection via the mediation device 10. On the other hand, the service server 14, which is set up by the manufacturer or seller of the auxiliary terminal device 13, stores a support web page that corresponds to the device information of the auxiliary terminal device 13. In other words, the support web page contains the setting or adjustment steps of the auxiliary terminal device 13. Referring to FIG. 4, in order to send the support web page from the service server 14 to the main terminal device 11 and thereby allow the user to set or adjust the auxiliary terminal device 13 according to the support web page, the following steps are performed:

(400) The mediation device 10 connects to the auxiliary terminal device 13. More specifically, the connection can be made using the aforementioned Wi-Fi technology or the like.

(401) The mediation device 10 determines that the auxiliary terminal device 13 cannot connect to the Internet 12 via the mediation device 10.

(402) The mediation device 10 retrieves the device information from the auxiliary terminal device 13.

(403) According to the device information of the auxiliary terminal device 13, the mediation device 10 connects to the service server 14 via the Internet 12.

(404) Based on the device information, the mediation device 10 downloads the support web page from the service server 14.

(405) The mediation device 10 sends the support web page to the main terminal device 11, so as for the main terminal device 11 to display the support web page in its browser.

According to the steps (400) to (405), when the auxiliary terminal device 13 has the wrong settings that hinder connection to the Internet 12, the mediation device 10 downloads the support web page applicable to the auxiliary terminal device 13 in a timely manner and sends the support web page immediately to the main terminal device 11. The user can view the setting or adjustment steps specified in the support web page directly from the browser of the main terminal device 11, without having to take extra time in finding a solution to the connection problem at hand. The technical features of the second preferred embodiment also keep the user from calling the ISP or the manufacturer of the auxiliary terminal device 13 (e.g., a mobile network operator) immediately after the auxiliary terminal device 13 fails due to connection or setting problems, thereby substantially relieving the human resource and financial burden on the ISP or the manufacturer. In addition, the user is spared not only the trouble of reading through the user guide of the auxiliary terminal device 13 but also the trouble of installing the explanation program from the user guide CD. The user only has to view the contents shown in the browser of the main terminal device 11 to know the steps for troubleshooting network connection problems, which is highly convenient.

To sum up, in order to solve network connection problems of the main terminal device 11 (e.g., a personal computer), the present invention provides an assisting web page (pre-stored in the mediation device 10) to familiarize the user with the steps for troubleshooting connection problems. On the other hand, in order to solve network connection problems of the auxiliary terminal device 13 (e.g., a mobile phone), the present invention enables download of a support web page for assisting the user in setting or adjusting the auxiliary terminal device 13. Therefore, no matter which kind of terminal devices are used to connect to the Internet 12 by way of the mediation device 10, the user will know from the main terminal device 11 the troubleshooting, setting or adjustment steps as soon as a network connection problem takes place. Consequently, the various drawbacks of the conventional approaches to troubleshooting network connection problems are effectively overcome.

While the invention has been described by means of specific embodiments, numerous modifications and variations could be made thereto by those skilled in the art without departing from the scope and spirit of the invention set forth in the claims.

What is claimed is:

1. A system for assisting a user in troubleshooting network connection problems, the system comprising:
   a main terminal device;
   a mediation device provided with a storage unit, wherein the storage unit stores an assisting web page, and the mediation device is connected to the main terminal device, is adapted to send a web page request instruction received from the main terminal device to the Internet according to a website address contained in the web page request instruction, and is adapted to send the assisting web page to the main terminal device upon determining that the mediation device itself is not connected to the Internet; and
   an auxiliary terminal device having device information stored therein and being wirelessly connected to the mediation device, said auxiliary terminal device being adapted to connect to the Internet through the mediation device, wherein, when the mediation device is connected to the Internet and determines that the auxiliary terminal device cannot connect to the Internet through the mediation device, the mediation device retrieves the device information from the auxiliary terminal device, connects to a service server corresponding to the device information through the Internet, downloads a support web page corresponding to the device information from the service server, and sends the support web page to the main terminal device.

2. The system of claim 1, wherein the assisting web page contains steps for troubleshooting network connection problems, the steps comprising:
verifying whether a splitter connected to the mediation device is connected to a wall jack;
verifying whether the mediation device and the splitter are properly connected to each other;
verifying light signals of the mediation device; and
restarting the mediation device.

3. A system for assisting a user in troubleshooting network connection problems, the system comprising:
a main terminal device;
an auxiliary terminal device having device information stored therein; and
a mediation device connected to the main terminal device and wirelessly connected to the auxiliary terminal device, said auxiliary terminal device being adapted to connect to the Internet through the mediation device, wherein, when the mediation device is connected to the Internet and determines that the auxiliary terminal device cannot connect to the Internet through the mediation device, the mediation device retrieves the device information from the auxiliary terminal device, connects to a service server corresponding to the device information through the Internet, downloads a support web page corresponding to the device information from the service server, and sends the support web page to the main terminal device.

4. A method for assisting a user in troubleshooting network connection problems, the method being applicable to a mediation device, wherein the mediation device stores an assisting web page, is connected to a main terminal device, and is wirelessly connected to an auxiliary terminal device having device information stored therein, said auxiliary terminal device being adapted to connect to the Internet through the mediation device, the method comprising the steps, performed by the mediation device, of:
receiving a web page request instruction from the main terminal device;
when the mediation device determines that the mediation device itself is not connected to the Internet, sending the assisting web page to the main terminal device;
when the mediation device is connected to the Internet and determines that the auxiliary terminal device cannot connect to the Internet through the mediation device, retrieving the device information from the auxiliary terminal device;
connecting to a service server corresponding to the device information through the Internet;
downloading a support web page corresponding to the device information from the service server; and
sending the support web page to the main terminal device.

5. The method of claim 4, wherein the assisting web page contains steps for troubleshooting network connection problems, said steps comprising:
verifying whether a splitter connected to the mediation device is connected to a wall jack;
verifying whether the mediation device and the splitter are properly connected to each other;
verifying light signals of the mediation device; and
restarting the mediation device.

6. A method for assisting a user in troubleshooting network connection problems, the method being applicable to a mediation device, wherein the mediation device is connected to a main terminal device and is wirelessly connected to an auxiliary terminal device having device information stored therein, and the auxiliary terminal device is adapted to connect to the Internet through the mediation device, the method comprising the steps, performed by the mediation device, of:
when the mediation device is connected to the Internet and determines that the auxiliary terminal device cannot connect to the Internet through the mediation device, retrieving the device information from the auxiliary terminal device;
connecting to a service server corresponding to the device information through the Internet;
downloading a support web page corresponding to the device information from the service server; and
sending the support web page to the main terminal device.

* * * * *